(12) United States Patent
Aull

(10) Patent No.: US 6,934,859 B2
(45) Date of Patent: Aug. 23, 2005

(54) AUTHENTICATED SEARCH ENGINES

(75) Inventor: Kenneth W. Aull, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 839 days.

(21) Appl. No.: 09/821,566

(22) Filed: Mar. 29, 2001

(65) Prior Publication Data

US 2003/0208690 A1 Nov. 6, 2003

Related U.S. Application Data

(60) Provisional application No. 60/210,463, filed on Jun. 9, 2000, and provisional application No. 60/229,336, filed on Sep. 1, 2000.

(51) Int. Cl.[7] .............................................. G06F 17/00
(52) U.S. Cl. ............................ 713/201; 709/201; 707/6
(58) Field of Search ................................ 713/200–202, 713/150–153; 709/201–203; 707/3–10, 100–104.1

(56) References Cited

U.S. PATENT DOCUMENTS 5,572,673 A    11/1996   Shurts
5,991,751 A    11/1999   Rivette

FOREIGN PATENT DOCUMENTS

EP           0926605        6/1999

OTHER PUBLICATIONS

Securing electronic commerce: reducing the SSL overhead Apostolopoulos, G.; Peris, V.; Pradhan, P.; Saha, D.; Network, IEEE, vol.: 14 , Issue: 4 , Jul.–Aug. 2000, pp. 8–16.*

Security server incorporating relay servers for distributed processing environments Imada, M.; Kogiku, I.; Autonomous Decentralized Systems, 1999. Integration of Heterogeneous Systems. Proceedings. The Fourth International Symposium on Mar. 21–23, 1999, pp. 246–251.*

Policy based access control framework for large networks Duan Haixin; Wu Jianping; Li Xing; Networks, 2000. (ICON 2000). Proceedings. IEEE International Conference on , Sep. 5–8, 2000, pp. 267–272.* http://www.windowsecurity.com/.* http://www.libertas-solutions.com/solutions/search--engine-promotion/control-search-engine-access.php.*

Charles R. Young, *A Security Policy for a Profile–Oriented Operating System*, May 4, 1981, pp. 273–282.

* cited by examiner

*Primary Examiner*—David Jung
(74) *Attorney, Agent, or Firm*—Tarolli, Sundheim, Covell & Tummino L.L.P.

(57) ABSTRACT

An accessing technique includes a first networked entity having a first security level and a search engine having a second security level. Access is allowed to the first networked entity upon the second security level being equal to or higher than the first security level. Access to the search engine by a user having a third security level is allowed upon the third security level being equal to or higher than the second security level. The search engine and the user may present a digital signature certificate in attempting access of the first networked entity and the search engine respectively. The first networked entity may query a second networked entity to determine the security level of the search engine relative to the first networked entity and the search engine may query the second networked entity to determine the security level of the user relative to the search engine.

18 Claims, 3 Drawing Sheets

AUTHENTICATED SEARCH ENGINES

CROSS-REFERENCE TO RELATED APPLICATIONS

This application claims the benefit of Provisional Application Ser. No. 60/210,463, filed in the U.S. Patent and Trademark Office on Jun. 9, 2000, and Provisional Application Ser. No. 60/229,336, filed in the U.S. Patent and Trademark Office on Sep. 1, 2000, the contents of which are expressly incorporated herein by reference.

BACKGROUND OF THE INVENTION

1. Field of the Invention

The present invention relates to search engines in a PKI (Public Key Infrastructure). More particularly, the present invention relates to authenticated search engines having different levels of security which are capable of accessing networked entities having different levels of security.

2. Description of the Related Art

A PKI is a set of policies, procedures, and software that permit an organization to generate, issue, and manage public/private cryptographic keys in a manner that allows users to reliably determine the identity of the owner of each public/private key pair. The key components of a PKI include: (1) a mechanism for reliably conveying the identity of a key pair's owner to the end user; (2) software applications for generating and managing key pairs that support this mechanism; (3) a set of procedures for generating and revoking key pairs that ensures that the identity of the owner can be reliably determined; and (4) a set of policies defining who may obtain public/private key pairs and identifying how each pair may be used.

As to component (1) of a PKI, most PKI, establish that the user owns a key pair by using an electronic document called a digital certificate. Digital certificates contain information identifying the owner of the key pair, the public component of the pair, and the period of time for which the certificate is valid. The digital certificate also identifies technical information about the key itself, such as the algorithm used to generate the key and the key length.

Certificates are generated by organizations that are responsible for verifying the identity of individuals, or in some instances, other organizations to which certificates are being issued. The identity of the certifying organization, referred to as a certificate authority, is recorded in each certificate, which is then signed using a private key known only to the certificate authority itself. This allows users to verify both the integrity of the certificate and the identity of the authority that issued it.

Certificate authorities generally employ any of a number of different commercially available software products to manage the creation, renewal, and revocation of certificates. These Certificate Management Systems (CMS) take information obtained through the user registration process, create a certificate, and sign it with the certificate authority's private key. The applicable CMS software maintains a database of all of the certificates that it has issued, and their statuses. The CMS is also responsible for revoking certificates, and for publishing a certificate revocation list that identifies the date on which each certificate was revoked, and the reason for the revocation. This information allows relying users (that is, those individuals or systems that are performing encryption or signature verification actions based on certificates) to review the status of a certificate, to assess its usability. A list of distribution points from which the CRL can be obtained are identified in the certificate itself.

In issuing a certificate, a certificate authority is stating that is has verified that the public key that appears in the certificate (and, by extension, the corresponding private key) belongs to the individual listed in the certificate. The integrity with which the registration process operates is therefore of great importance. The process must provide mechanisms for reliably identifying an individual and for verifying that the public key listed in the certificate belongs to that individual. Equally important, the certificate authority must provide procedures for revoking certificates in the event that the private key is compromised. A compromised private key calls into question the entire basis for trusting a certificate, since more than one individual may be using that private key to sign documents, or more than one individual may be able to decrypt documents encrypted using the corresponding public key.

Relying individuals and organizations must have a clear understanding of their certificate authority's operation processes. As a result, most certificate authorities publish a Certificate Practice Statement (CPS) that details the processes for registering users, issuing certificates, renewing certificates and revoking certificates. The CPS is normally published on the certificate authority's website.

Certificates often contain additional information that identifies an individual as a member of a particular organization and perhaps the role that they play in the organization. For example, the certificate may identifying the certificate holder as being either an employee of a company or a customer or subcontractor or supplier of the company. The policies determining who is eligible to hold a certificate are therefore important if individuals and organizations are to rely upon this information. These policies govern the overall operation of the certificate authority.

When Web servers are secured so that users must present digital signature certificates in order to access the servers, any other entity that also wishes to access such servers must also present digital signature certificates in order to access them. For example, if a search engine attempts to access a Web server for the purpose of indexing the Web server's contents, the search engine must present a valid digital signature certificate. Normally, this does not present any problems.

On the other hand, if the Web servers have been secured so that there are multiple levels of security, that is, only users having particular levels of security are allowed to access a given server, then the only present disadvantageous solution was to grant the highest level of access to the search engines so that they may access every Web server.

Unfortunately, by granting the highest level of access to a search engine compromises the security of higher level Web servers by allowing any user to access the indexing results of the server which was granted the highest level of access. For example, if a user having "Level 1" security is able to view a content listing of a Web server having a "Level 2" security, then this compromises the security of the Web server in that its content listing is divulged to a user not having the proper level of security. Accordingly, a problem exists with respect to allowing search engines to search Web servers having multiple levels of security without compromising the security of the Web servers.

SUMMARY OF THE INVENTION

An object of the present invention is to provide an accessing technique in which different search engines having different levels of security are capable of accessing networked entities, such as Web servers, having different levels of security.

Another object of the present invention is to provide an accessing technique in which a search engine must provide a digital signature certificate to a networked entity, such as a Web server, prior to being allowed access thereto.

Still another object of the present invention is to provide an accessing technique as above in which access is allowed to the search engine only upon a determination that the security level of the search engine is equal to or higher than that of the networked entity, such as a Web server.

Another object of the present invention is to provide an accessing technique as above in which the networked entity, such as a Web server, accesses a directory prior to providing access to the search engine.

Yet still another object of the present invention is to provide an accessing technique as above in which different users having different levels of security are capable of accessing different search engines.

Still another object of the present invention is to provide an accessing technique as above in which a user must present a digital signature certificate to a search engine prior to being allowed access thereto.

Another object of the present invention is to provide an accessing technique as above in which access is allowed to the user only upon a determination that the security level of the user is equal to or higher than that of the search engine.

BRIEF DESCRIPTION OF THE DRAWINGS

The foregoing and a better understanding of the present invention will become apparent from the following detailed description of example embodiments and the claims when read in connection with the accompanying drawings, all form a part of the disclosure of this invention. While the foregoing and following written and illustrated disclosure focuses on disclosing example embodiments of the invention, it should be clearly understood that the same as by way of illustration and example only and the invention is not limited thereto. The spirit and scope of the present invention are limited only by the terms of the appended claims.

The following represents a brief description of the drawings, wherein.

DETAILED DESCRIPTION

Figure 1:
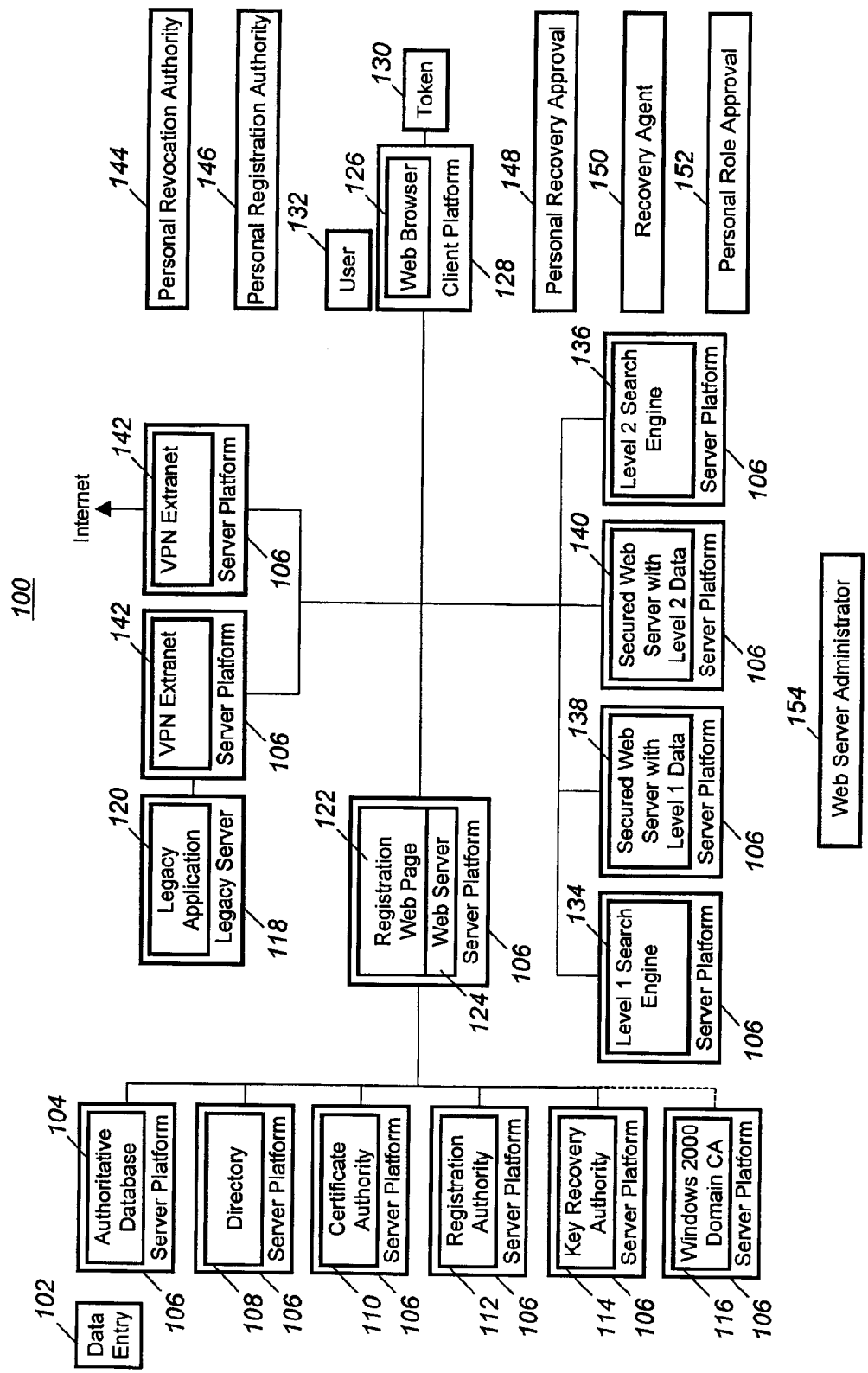
FIG. 1 is a block diagram illustrating an exemplary architecture of a network in which the PKI processes of the present invention may be practiced.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Lastly, well-known components and connections have not been shown within the drawing figures for simplicity of illustration and discussion and so is not to obscure the invention.

FIG. 1 illustrates an exemplary architecture of a network 100 in which the Public Key Infrastructure (P.K.I) processes of the present invention may be practiced. However, it should be understood that the present invention is not limited to the network 100 of FIG. 1. The network 100 includes data entry 102, which performs a data entry function for authoritative database 104, which is resident on the server platform 106. A server platform 106 is referred to in this description, but it should be understood that the present invention is not limited to any particular server architecture. The server platform 106 may be, without limitation, a UNIX or Windows NT server. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification, etc., of the members of the group or enterprise. Directory 108 has the structure of the database but is optimized for fast look-up of information stored therein rather than fast data entry. The data in the directory 108 is not changed frequently but is required to be accessed rapidly and functions on-line as a fast phone book, containing reference information about the members of the group or enterprise stored in the authoritative database 104. Certificate authority 110 is off-the-shelf software executed on server platform 106, providing storage of certificates and related information used by the present invention as described in more detail hereinafter. Registration authority 112 is also off-the-shelf software executable on server platform 106 regarding registration performed by the present invention as described in more detail hereinafter. Key authority 114 is also off-the-shelf server software which is executable on server platform 106 for recovering keys from members of the group or enterprise as described in more detail hereinafter. Windows 2000 Domain CA 11 may use certificates provided by the present invention for a single sign-on to the network 100 of FIG. 1. Legacy server 118 executes legacy application programs 120. The legacy server may be, without limitation, a main frame, mini-computer, workstation, or other server hosting legacy software applications that are designed to be run on PKI processes in accordance with the present invention. The legacy applications 120 are accessible on the client side by a custom client 128 such as an emulator or custom database Graphic User Interface (GUI). Examples of emulators are terminal emulators of an IBM 3270 or terminal emulators of a vt 100. Registration web page 122, which may be one or more pages, functions as the user interface to the network 100 of FIG. 1. Web server 124 is a software application which serves Web Pages, such as Web Page 122 or other HTML outputs, to a web browser client which may be, without limitation, Apache or a Microsoft Internet Information Server. Web browser 126 is resident on client platform 128 which may be any user computer. Web browser 126 is a client software application for browsing web pages such as but not limited to HTML or XML protocols or other protocols. The Web browser 126 is programmed to operate with PKI certificates issued by the certificate authority 110. Examples of web browsers which have this capability are Netscape Navigator and the Microsoft Internet Explorer. The token 130 is a smart card, USB (United Serial Bus), or other hardware token capable of generating, storing, and using PKI certificates. A user 132 is a person using the network 100. A user 132 transitions through a number of states which include a new user, current user, and a former user who no longer is a member of the group or enterprise. The network 100 is described with reference to two levels of security, but the number of the levels of security is not a limitation of the present invention, with each level corresponding to a different security requirement. The level 1 search engine 134 is a search engine which is permitted to search through the network 100 but is allowed access to only level 1 data, which is the lowest level of security and may be, without limitation, data which is freely distributable. Level 2 data may be considered to be proprietary. Level 2 search engine 136 is a search engine which is allowed to search through both level 1 and level 2 data. A level N search engine (not illustrated) is a search engine which is allowed to search through servers possessing data levels 1 through N. A secured level server with level 1 data 138 is a Web server containing only level 1 data, which is secured so that users must have level 1 access (at least) to access the server. A secured Web server with level 2 data 140 is a Web server that contains level 2 data which has been secured so that users must have level 2 access, with level 2 users having access to both level 1 and level 2 servers. A secured Web server with level N data (not illustrated) is a Web server that contains level N data which is accessible by a user with level N or above access. VPN Extranet 142 is a software application which functions as a network gateway which, as illustrated, may be either to legacy server 118 and legacy application 120 or to an external network such as the Internet. Personal revocation authority 144 is a person who is in charge of revocation of members from the network 100. Personal registration authority 146 is a person who is in charge of registration of members in the network 100. Personal recovery approval 148 is a person in charge of obtaining recovery of certificates. A Recovery Agent 150 is a person who performs recovery of certificates and may only recover a certificate if the certificate has first been designated as recoverable by another person. Personal role approval 152 is a person who approves different role functions within the network 100. A Web server administrator is in charge of various web functions in the network 100.

Figure 2:
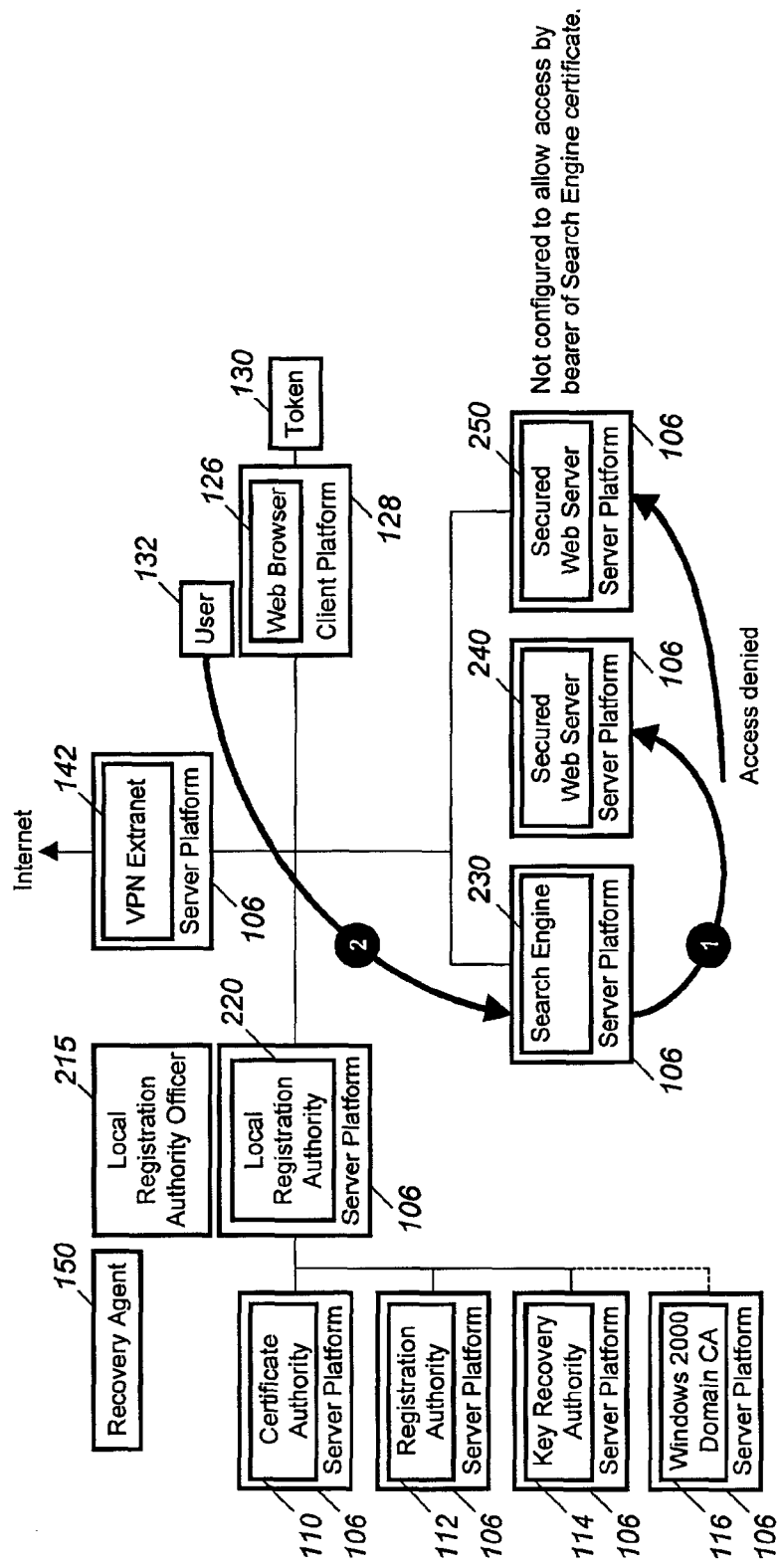
FIG. 2 is a block diagram illustrating the operation of a disadvantageous secured Web server arrangement.

FIG. 2 is a block diagram illustrating the operation of a disadvantageous secured Web server arrangement. The arrangement of FIG. 2 is quite similar to that of FIG. 1 with the following exceptions, namely, a Local Registration Authority 220 and Local Registration Authority Officer are provided and the search engines 134 and 136 and secured Web servers 138 and 140 are replaced by the single search engine 230 and the secured Web servers 240 and 250.

In the arrangement of FIG. 2, the search engine 230 does not have multiple security levels such that the search engine 230 is able to search every secured Web server, such as server 240, which has been configured to allow access by the bearer of the search engine signature certificate, irrespective of the security level. On the other hand, the search engine 230 does not have access to the Web server 250 which has not been configured to allow access by the bearer of the search engine signature certificate.

In step 1 of FIG. 2, the search engine 230 accesses the secured Web server 240 using the search engine's signature certificate to authenticate the identity of the search engine 230 to the Web server 240. Accordingly, upon authentication of the search engine's signature certificate, the search engine 230 can catalog and index the contents of the Web server 240. If there are secured Web servers in the enterprise network that have not been configured to allow access by the search engine 230, such as secured Web server 250, access will be denied to the search engine 230 and the contents of Web server 250 cannot be catalog or indexed.

In step 2 of FIG. 2, the user 132 accesses the search engine 230 employing the user's signature certificate to authenticate the identity of the user 132 to the search engine 230. The user 132 can then perform a query and obtain a result from the search engine 230.

Figure 3:
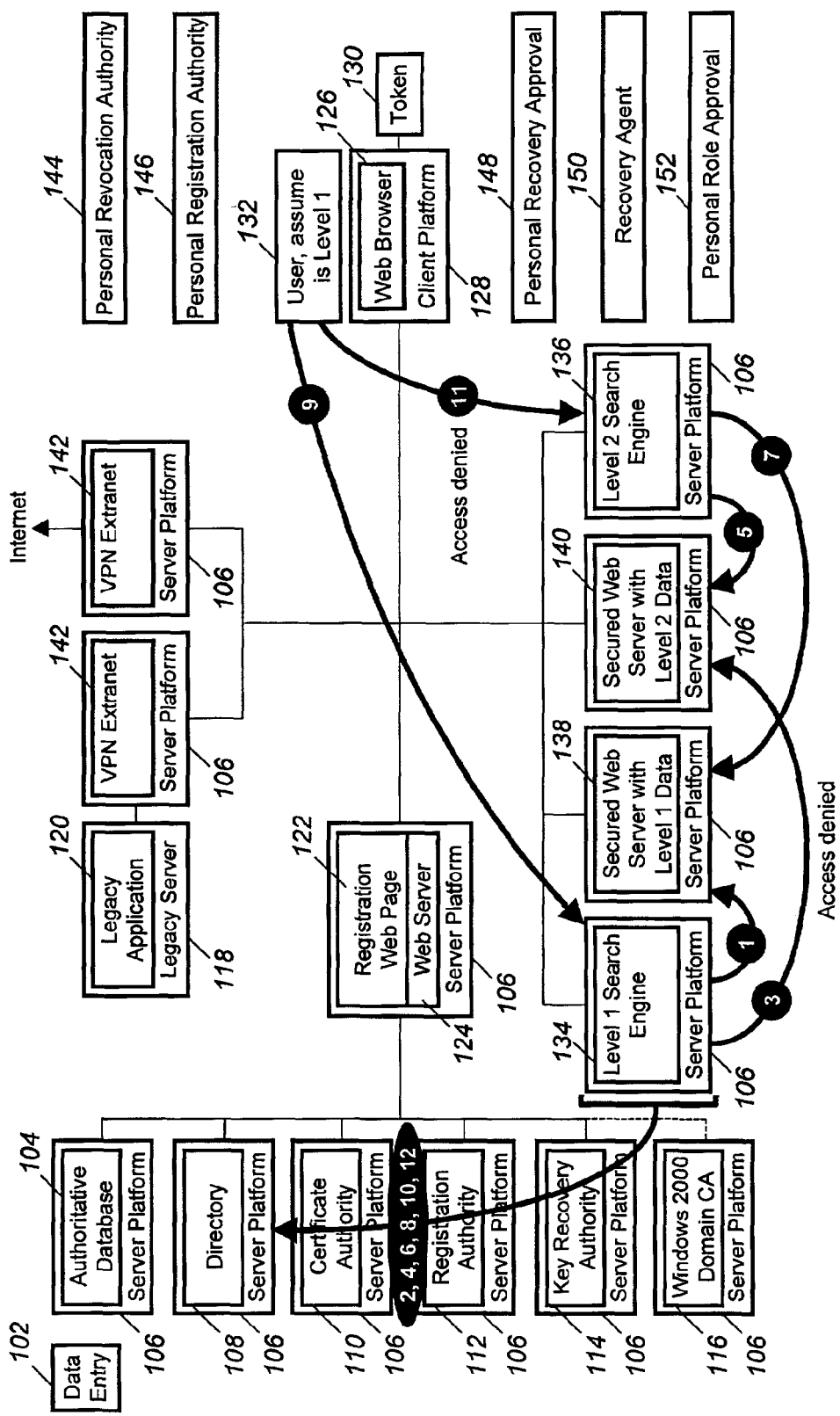
FIG. 3 is a block diagram illustrating an example of the operation of a secured Web server arrangement in accordance with present invention.

FIG. 3 is a block diagram illustrating an example of the operation of the secured Web server arrangement in accordance with the present invention. The elements of FIG. 3 correspond to the elements illustrated in FIG. 1. It is noted that in accordance with the present invention, there are search engines and secured Web servers with different levels of security. Namely, search engine 134 is a level 1 search engine while search engine 136 is a level 2 search engine. Similarly, secured Web server 138 is a level 1 Web server while secured Web server 140 is a level 2 Web server.

Referring to FIG. 3, in step 1, the level one search engine 134 attempts to access the level 1 Web server 138 in order to create and index and/or catalog of information stored in the level 1 Web server 138. The level 1 search engine 134 must present its signature certificate in order to gain access to the level 1 Web server 138. In step 2, the level 1 Web server 138 queries the Directory 108 to confirm that the level 1 search engine 134 is allowed to access the level 1 Web server 138 and if so, the index and/or catalog is created.

In step 3, the level 1 search engine 134 attempts to access the level 2 Web server 140, presenting its signature certificate to the Web server 140. In step 4, the level 2 Web server 140 queries the Directory 108 to determine if the level 1 search engine 134 is allowed to access the level 2 Web server 140. The Directory then informs the level 2 Web server 140 that the level 1 search engine 134 is not allowed to access the level 2 Web server 140, since level 1 search engines are not allowed access to level 2 Web servers and accordingly, access is denied.

In a similar fashion, in step 5, the level 2 search engine 136 attempts to access the level 2 Web server 140 and after querying the Directory 108 in step 6, the level 2 Web server allows access to it by the level 2 search engine 136 since level 2 search engines are allowed access to level 2 Web servers. Furthermore, in step 7, the level 2 search engine 136 attempts to access the level 1 Web server 138 and after querying the Directory 108 in step 8, the level 1 Web server 138 allows access to it by the level 2 search engine 136 since level 2 search engines are allowed access to level 1 Web servers.

In step 9, the user 132, who it is assumed to have level 1 security, attempts to access the level 1 search engine 134. The user 132 employs its signature certificate to authenticate its identity to the search engine 134. In step 10, the level 1 search engine 134 queries the Directory 108 to confirm that the level 1 user 132 is allowed to access the level 1 search engine 134. Since level 1 users are allowed access to level 1 search engines, access is allowed.

In step 11, the level 1 user 132 attempts to access the level 2 search engine 136. The user 132 employs its signature certificate to authenticate its identity to the search engine 136. In step 12, the level 2 search engine 136 queries the Directory 108 to determine if the level 1 user 132 is allowed access to it. Since level 1 users are not allowed access to level 2 search engines, access is denied.

By providing multiple search engines, one for each security level, an enterprise can maintain search engines for all its Web servers without compromising the security of the Web servers. By providing such multiple search engines, each search engine can access Web servers having the same level of security or a lower level of security but cannot access Web servers having a higher level of security.

The only drawback to this technique is that the enterprise must maintain multiple search engines. While each search engine may be hosted on its own computing platform, the multiple search engines could all reside on a single platform with multiple software search services all running on the same hardware.

The networks discussed above in the example embodiment may include the Internet, an intranet, a WAN (Wide Area Network), a LAN (Local Area Network), or any other networked grouping of elements.

This concludes the description of the example embodiments. Although the present invention has been described with reference to an illustrative embodiment thereof, it should be understood that numerous other modifications and embodiments can be devised by those skilled of the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled of the art.

For example, the particular arrangement of elements illustrated in the drawing figures is by no means unique. Furthermore, the various server platforms may either be combined or separated to suit specific needs. Still furthermore, one enterprise officer may serve more than one function or vice versa.

What is claimed is:

1. An accessing method comprising:
   attempting access of a first networked entity having a first preselected security level by a search engine having a second preselected security level;
   allowing access of the first networked entity by the search engine upon the second security level being equal to or higher than the first security level;
   attempting access of the search engine by a user having a third preselected security level; and
   allowing access of the search engine by the user upon the third security level being equal to or higher than the second security level.

2. The method of claim 1, further comprising the search engine presenting a digital signature certificate in attempting access of the first networked entity.

3. The method of claim 2, further comprising the first networked entity querying a second networked entity to determine if the security level of the search engine is equal to or higher than the security level of the first networked entity.

4. The method of claim 1, further comprising the user presenting a digital signature certificate in attempting access of the search engine.

5. The method of claim 4, further comprising the search engine querying a second networked entity to determine if the security level of the user is equal to or higher than the security level of the search engine.

6. The method of claim 1, wherein said first networked entity is a Web server.

7. The method of claim 1, further comprising
   attempting access, by a plurality of search engines each having an associated preselected security level, to a plurality of networked entities each having an associated preselected security level; and
   allowing access to networked entities by search engines having a security level equal to or higher than a respective networked entity.

8. The method of claim 7, further comprising
   attempting access by the user, to at least one of the plurality of search engines; and
   allowing access by the user to search engines having a security level equal to or below the user.

9. A network comprising:
   a first networked entity having a first preselected security level; and
   a search engine having a second preselected security level, wherein the first networked entity allows access by the search engine upon the second security level being equal to or higher than the first security level, wherein the search engine allows access by a user having a third preselected security level upon the third security level being equal to or higher than the second security level.

10. The network of claim 9, further comprising a digital signature certificate which is presented to the first networked entity upon the search engine attempting access of the first networked entity.

11. The network of claim 10, further comprising a second networked entity, wherein the first networked entity queries the second networked entity to determine if the security level of the search engine is equal to or higher than the security level of the first networked entity.

12. The network of claim 9, further comprising a digital signature certificate which is presented to the search engine upon the user attempting to access the search engine.

13. The network of claim 12, further comprising a second networked entity, wherein the search engine queries the second networked entity to determine if the security level of the user is equal to or higher than the security level of the search engine.

14. The network of claim 9, further comprising a plurality of search engines each having a preselected security level, wherein each search engine of the plurality of search engines is allowed access to networked entities, of a plurality of networked entities, that have a security level at or below the security level of a respective search engine.

15. The network of claim 14, wherein the user is allowed to access search engines having a security level at or below the security level of the user.

16. A network comprising:
   a plurality of networked entities, each having a preselected security level; and
   a plurality of search engines each having a preselected security level, wherein each search engine of the plurality of search engines is allowed access to networked entities having a security level at or below the security level of a respective search engine, wherein a user having a preselected security level is allowed access to search engines having a security level at or below the security level of the user.

17. The network of claim 16, further comprising a digital signature certificate which is presented to a networked entity upon a search engine attempting to access a networked entity.

18. The network of claim 16, further comprising a digital signature certificate which is presented to a search engine upon the user attempting to access a search engine.

* * * * *